(12) United States Patent
Kim et al.

(10) Patent No.: US 12,190,459 B2
(45) Date of Patent: Jan. 7, 2025

(54) METHOD AND APPARATUS OF PROVIDING MIXED REALITY COMBINED PHYSICAL SPACE

(71) Applicant: POSTECH Research and Business Development Foundation, Pohang-si (KR)

(72) Inventors: Wook Sung Kim, Pohang-si (KR); Ji Hyung Kim, Pohang-si (KR); Kyeong Sun Kim, Pohang-si (KR); Sun Geun Park, Pohang-si (KR)

(73) Assignee: DEVELOPMENT FOUNDATION, Pohang-si (KR)

( * ) Notice: Subject to any disclaimer, the term of this patent is extended or adjusted under 35 U.S.C. 154(b) by 147 days.

(21) Appl. No.: 17/965,651

(22) Filed: Oct. 13, 2022

(65) Prior Publication Data

US 2024/0046574 A1  Feb. 8, 2024

(30) Foreign Application Priority Data

Aug. 8, 2022  (KR) .................. 10-2022-0098404

(51) Int. Cl.
*G06T 15/00* (2011.01)
*G06T 7/90* (2017.01)
(Continued)

(52) U.S. Cl.
CPC .............. *G06T 19/006* (2013.01); *G06T 7/90* (2017.01); *G06T 15/506* (2013.01); *G06T 19/20* (2013.01);
(Continued)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20;
(Continued)

(56) References Cited

U.S. PATENT DOCUMENTS

| 2016/0187199 A1* | 6/2016 | Brunk .................. G01J 3/0208 348/89 |
| 2018/0001198 A1* | 1/2018 | Frappiea ............. A63F 13/2145 |

(Continued)

FOREIGN PATENT DOCUMENTS

| JP | 2020-042334 A | 3/2020 |
| KR | 10-2022-0096381 | 7/2022 |

*Primary Examiner* — Gordon G Liu
(74) *Attorney, Agent, or Firm* — Hauptman Ham, LLP (57) ABSTRACT

A method for providing a mixed reality combined physical space, performed by an electronic controller of a physical space, may comprise: receiving a signal for conversion from a traditional physical space to a mixed reality physical space; controlling an operation of an actuator coupled to a curtain or blind that suppresses reflection of light on front and wall surfaces of a physical space according to an input of the signal such that the curtain or blind is unfolded; and controlling an illumination of a lighting of the mixed reality physical space to lower or increase the illumination at a specific level interval or continuously, wherein a quality of mixed reality content provided to the mixed reality physical space is improved by controlling the illumination of the lighting.

20 Claims, 10 Drawing Sheets

(51) Int. Cl.
*G06T 15/50* (2011.01)
*G06T 19/00* (2011.01)
*G06T 19/20* (2011.01)
*G06V 10/56* (2022.01)
*G06V 10/60* (2022.01)

(52) U.S. Cl.
CPC .............. *G06V 10/56* (2022.01); *G06V 10/60* (2022.01); *G06T 2219/2012* (2013.01)

(58) Field of Classification Search
CPC ....... G06T 2200/04; G06T 2207/10016; G06T 2207/30244; G06T 2219/024; G06T 2219/2016; G06T 2210/12; G06T 2210/21; G06T 7/70; G06F 16/51; G06F 21/602; H04N 23/64; H04N 23/90; G06V 20/20
USPC ......................................................... 345/419
See application file for complete search history.

(56) References Cited

U.S. PATENT DOCUMENTS

2021/0382559 A1* 12/2021 Segev .................... H04N 23/69
2021/0399911 A1* 12/2021 Jorasch ............... H04L 12/1822

* cited by examiner

METHOD AND APPARATUS OF PROVIDING MIXED REALITY COMBINED PHYSICAL SPACE

CROSS-REFERENCE TO RELATED APPLICATIONS

This application claims priority to Korean Patent Application No. 10-2022-0098404, filed on Aug. 8, 2022, with the Korean Intellectual Property Office (KIPO), the entire contents of which are hereby incorporated by reference.

BACKGROUND

1. Technical Field

The present disclosure relates to a method and apparatus for providing a mixed reality combined physical space for providing a high sense of immersion to multiple users.

2. Related Art

A conventional augmented reality display mainly uses an optical see-through (OST) system in order to use the image of an external environment as it is. On the other hand, in a display using an OST system, the illuminance of surrounding environment is synthesized with the light generated in the display, which greatly affects color accuracy, and there is a problem in color gamut and color contrast deterioration due to the disadvantage of not being able to express a black color.

In order to solve this disadvantage of the OST system, conventional products use a visor or a replaceable neutral density (ND) filter that blocks ambient light through an optical coating on a front surface. There is a problem in that there is a large difference in the effect of blocking ambient light depending on the illuminance environment.

As described above, most researches for improving the color gamut visually felt by users in the existing augmented reality display are to the extent of designing and testing an optical system constructed on an optical table or an optical system of prototype, and thus, there is a practical difficulty in providing additional devices suitable for individual devices in order to block ambient light due to lack of versatility. Accordingly, there are no research cases in which such optical system is applied to actual environments.

SUMMARY

The present disclosure has been derived to meet the needs of the prior art described above, and an object of the present disclosure is to provide a method and apparatus for providing an augmented reality or mixed reality combined physical space capable of providing a high sense of immersion to multiple users.

Another object of the present disclosure is to provide a method and apparatus for providing a mixed reality combined physical space, which can effectively improve color accuracy in a display of an optical see-through system for augmented reality by configuring a convertible physical environment, such as a surrounding environment with illuminance conversion and high absorption coefficient, to implement an augmented reality or mixed reality combined physical space that can provide a high sense of immersion to multiple users.

Another object of the present disclosure is to provide a method and apparatus for providing a mixed reality combined physical space using an adaptive illuminance and color correction system for solving the problem of color accuracy in an existing display of an optical see-through system for augmented reality.

Another object of the present disclosure is to provide a method and apparatus for providing a mixed reality combined physical space, in which the surrounding environment can be constantly maintained at a color temperature desired by a user through an illuminance sensor combined with a color filter.

According to a first exemplary embodiment of the present disclosure, a method for providing a mixed reality combined physical space, performed by an electronic controller of a physical space, may comprise: receiving a signal for conversion from a traditional physical space to a mixed reality physical space; controlling an operation of an actuator coupled to a curtain or blind that suppresses reflection of light on front and wall surfaces of a physical space according to an input of the signal such that the curtain or blind is unfolded; and controlling an illumination of a lighting of the mixed reality physical space to lower or increase the illumination at a specific level interval or continuously, wherein a quality of mixed reality content provided to the mixed reality physical space is improved by controlling the illumination of the lighting.

The method may further comprise the step of analyzing a color chart of the illuminance of each stage of the lighting.

The method may further comprise the step of determining a first illuminance based on a color gamut of the mixed reality content according to an analysis result of the color chart.

The method may further comprise the step of storing in advance a plurality of illuminance values according to a type and content of the mixed reality content based on the mixed reality content used in the mixed reality physical space.

The method may further comprise the step of controlling the illuminance of the lighting over time based on the plurality of illuminance values.

According to a second exemplary embodiment of the present disclosure, a method for providing a mixed reality combined physical space, performed by any one headset among headsets for mixed reality of multiple users, may comprise: receiving a signal for conversion from a traditional physical space to a mixed reality physical space; controlling an operation of an actuator coupled to a curtain or blind that suppresses reflection of light on front and wall surfaces of the traditional physical space according to an input of the signal such that the curtain or blind is unfolded; and controlling an illumination of a lighting of the mixed reality physical space to lower or increase the illumination at a specific level interval or continuously, wherein a quality of mixed reality content provided to the mixed reality physical space is improved by controlling the illumination of the lighting.

The method may further comprise: analyzing a color chart of the illuminance of each stage of the lighting; and determining a first illuminance to be used in the mixed reality physical space based on a color gamut of the mixed reality content used in the mixed reality physical space according to an analysis result of the color chart.

The method may further comprise the step of storing in advance a plurality of illuminance values according to a type and content of the mixed reality content based on the mixed reality content used in the mixed reality physical space.

The method may further comprise the step of variably controlling the illuminance of the lighting over time based on the plurality of illuminance values.

The method may further comprise the steps of obtaining mixed reality content data from a memory or storage device in which the mixed reality content used in the mixed reality physical space is stored; identifying the mixed reality content based on the mixed reality content data; determining a first illuminance based on a color gamut of the mixed reality content used in the mixed reality physical space according to an identification result of the mixed reality content; and controlling the lighting of the mixed reality physical space to the first illuminance.

The step of determining may be performed based on a content-illuminance lookup table in which a relationship between the mixed reality content and the illuminance is set in advance.

According to a third exemplary embodiment of the present disclosure, an apparatus for providing a mixed reality combined physical space, which is connected to headsets for mixed reality of multiple users, may comprise: a signal reception unit that receives a signal for conversion from a traditional physical space to a mixed reality physical space; a first control unit that controls an operation of an actuator coupled to a curtain or blind that is installed on a front surface of the traditional physical space and suppresses reflection of light according to an input of the signal such that the curtain or blind is unfolded; a second control unit that controls an operation of at least one second actuator coupled to the curtain or blind that is installed on a wall surface of the traditional physical space and suppresses the reflection of light according to the input of the signal such that the curtain or blind is unfolded; a lighting control unit that controls an illuminance of a lighting of the mixed reality physical space to a preset illuminance according to an identification result of mixed reality content used in the mixed reality physical space or to a predetermined illuminance by color chart analysis in advance; an identification unit that acquires mixed reality content data used in the mixed reality combined physical space and identifies the mixed reality content based on the mixed reality content data; and a color chart analysis unit that analyzes a color chart of a corresponding illumination at a specific point in time according to a change in the lighting when the illuminance of the lighting is controlled by the lighting control unit to lower or increase the illuminance at a specific level interval or continuously.

The apparatus may further comprise a storage unit that stores mixed reality content data used in the mixed reality physical space, or stores information on a preset illuminance according to an identification result of the mixed reality content, or an illumination predetermined in advance by a color chart analysis, wherein the storage unit stores a plurality of illuminance values predetermined through the color chart analysis according to a type and content of the mixed reality content based on the mixed reality content used in the mixed reality physical space.

The lighting control unit may control the illuminance of the lighting overtime based on the plurality of illuminance values.

The apparatus for providing a mixed reality combined physical space may be a computing device mounted on any one headset of the headsets for mixed reality of the multiple users or connected to the specific headset through a wireless network, and the computing device may be an electronic device of a physical space and is provided with a processor.

The processor connected to the signal reception unit may determine a first illuminance based on a color gamut of the mixed reality content used in the mixed reality physical space according to an identification result of the mixed reality content, and may control an operation of the lighting to the first illuminance through the lighting control unit.

The processor connected to the signal reception unit may determine a first illuminance based on a color gamut of the mixed reality content used in the mixed reality physical space according to an analysis result of the color chart, and may control an operation of the lighting to the first illumination through the lighting control unit.

The color chart analysis unit may determine a plurality of illuminance values according to a type or content of the mixed reality content based on the mixed reality content used in the mixed reality physical space.

The lighting control unit may control the illuminance of the lighting overtime based on the plurality of illuminance values.

The plurality of illuminance values may be determined in an illuminance range in which the headsets for mixed reality are operable.

According to the above-described configuration of the method and apparatus for providing a mixed reality combined physical space, it is possible to provide multiple users with an environment that can provide a high level of immersion in mixed reality through global environment control without additional devices in a large physical space such as a lecture hall or training ground.

In addition, according to the present disclosure, it is possible to provide a mixed reality environment with a high immersion feeling to multiple users in a physical space such as a lecture room using augmented reality or mixed reality by preventing a decrease in color gamut due to ambient light, and it is possible to implement an optimized mixed reality environment for users and contents through illuminance conversion.

In addition, according to the present disclosure, since an additional device for an individual mixed reality device is not required, there is an advantage in that the cost burden can be eliminated and the usability can be improved.

DETAILED DESCRIPTION OF THE EMBODIMENTS

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
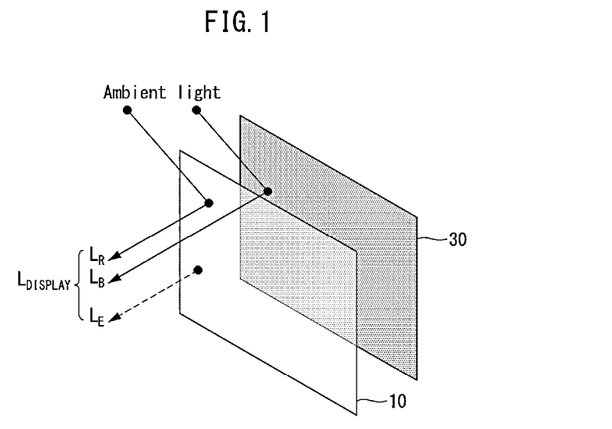
FIG. 1 is an exemplary diagram for describing an image transfer process and luminance definition of a projection display that can be used in a method for providing a mixed reality combined physical space according to an embodiment of the present disclosure.
Figure 2:
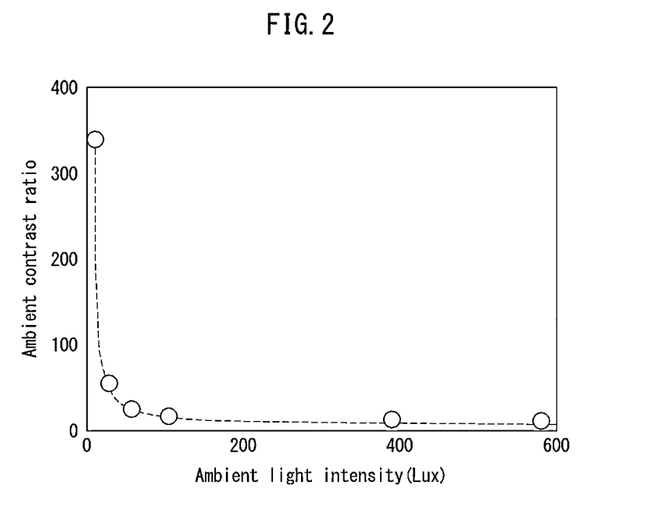
FIG. 2 is a graph illustrating a result of measuring a change in an ambient contrast ration according to an external illuminance environment of a mixed reality device equipped with the projection display of FIG. 1.

FIG. 1 is an exemplary diagram for describing an image transfer process and luminance definition of a projection display that can be used in a method for providing a mixed reality combined physical space according to an embodiment of the present disclosure. FIG. 2 is a graph illustrating a result of measuring a change in an ambient contrast ration according to an external illuminance environment of a mixed reality device equipped with the projection display of FIG. 1.

Referring to FIG. 1, a luminance $L_{DISPLAY}$ of a projection display 10 is defined with a background luminance $L_B$ by an external environment background 20 from ambient light, a reflection and glare luminance $L_R$ according to reflection or glare effect, and an emission luminance LE that transmits an image from a display device.

Unlike the environment of a portable device such as a mobile phone or a smart phone, in the image quality of the projection display 10, the influence of ambient light on the deterioration of the color accuracy of an image is large.

Particularly, as shown in FIG. 2, in the optical see-through system for augmented reality or mixed reality, a change in color accuracy such as ambient contrast ration by ambient light intensity is large, and in a bright external environment, the background luminance $L_B$ of the light becomes dominant, so that the visibility of the virtual image generated by the emission luminance LE is sharply reduced.

Figure 3:
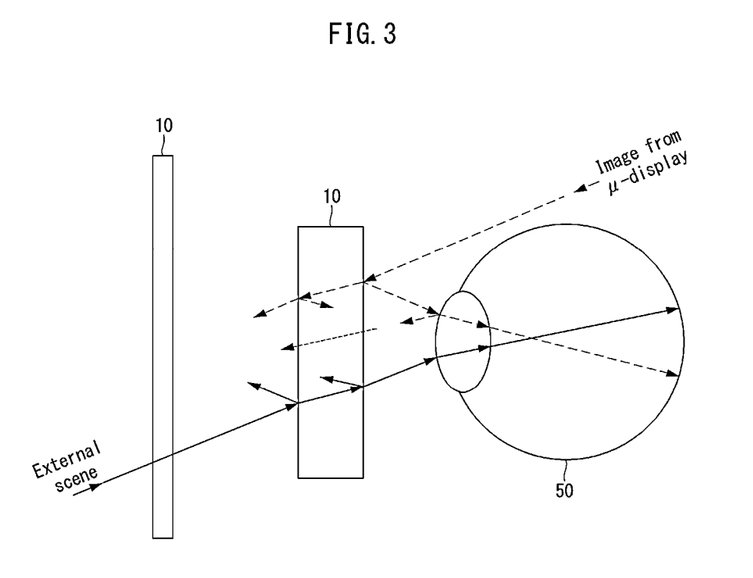
FIG. 3 is an exemplary diagram of a resolution of a virtual image for describing a factor that greatly affects a user's immersion feeling in the mixed reality device equipped with the projection display of FIG. 1.

FIG. 3 is an exemplary diagram of a resolution of a virtual image for describing a factor that greatly affects a user's immersion feeling in the mixed reality device equipped with the projection display of FIG. 1.

Referring to FIG. 3, an external scene enters the user's eyes 50 through a shader 40 and the projection display 10, and the image of a micro display installed in a headset for mixed reality (image from p-display) is reflected from the projection display 10 and enters the user's eye 50.

A first light representing the external scene may be first refracted on a first surface of the projection display 10 and secondarily refracted on a second surface of the projection display 10, and then transmitted to the retina through the lens of the user's eye. In addition, the second light representing the image of the micro display may be reflected from the second surface of the projection display 10 and transmitted to the retina through the lens of the user's eye.

Of course, a portion of the first light may be reflected at the first and second surfaces of the projection display 10, and a portion of the second light may be reflected at the second or first surface of the projection display 10, another portion of the second light may be reflected off the lens surface of the user's eye.

The image that is finally refracted by the lens of the user's eye and formed on the retina is about 90.16% of the first light and about 3.28% of the second light, excluding the portion that is reflected and lost on a propagation path. In this case, the resolution, color gamut, or ambient contrast ration can be calculated as "90.16/3.28" and expressed as about 27.5.

Figure 4:
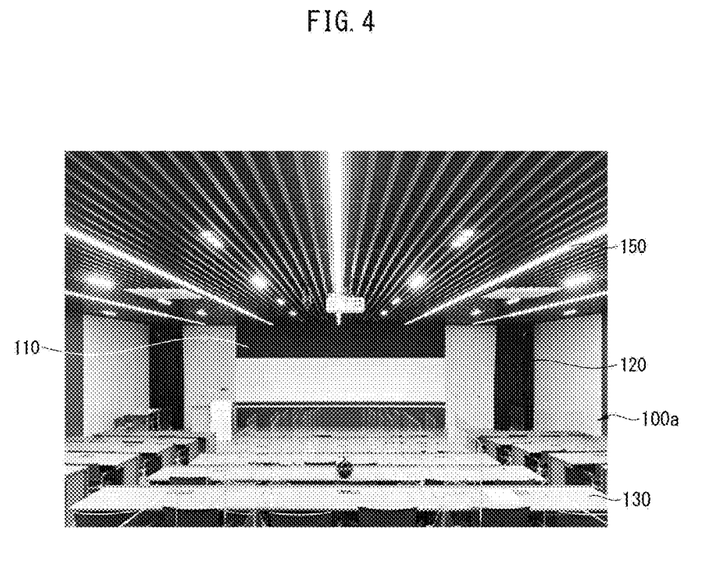
FIGS. 4 and 5 are exemplary diagrams for describing a traditional environment and immersive mixed reality environment of a mixed reality combined physical space.
Figure 5:
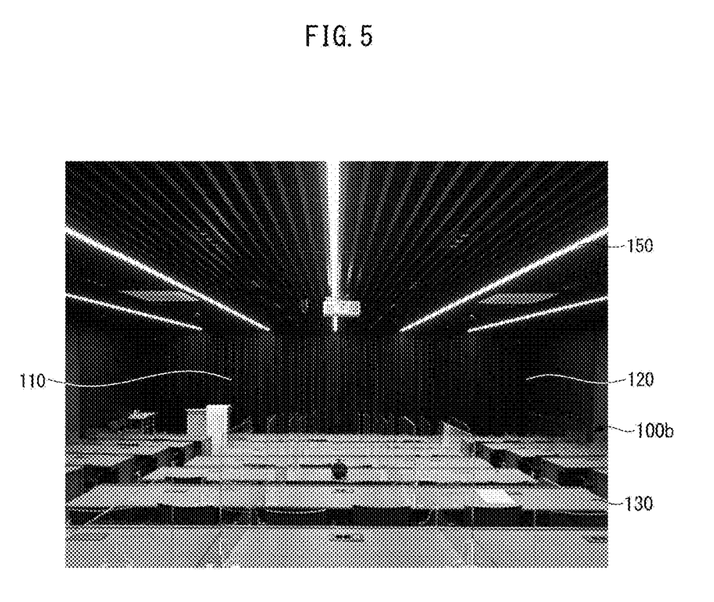

FIGS. 4 and 5 are exemplary diagrams for describing a traditional environment and immersive mixed reality environment of a mixed reality combined physical space.

In the present embodiment, when a display image is output through a mixed reality headset using an optical see-through system in a traditional physical space 100a as shown in FIG. 4, it is possible to solve the problem of a sharp decrease in the visibility of the virtual image by effectively improving the phenomenon in which the light from ambient lighting is synthesized with the virtual image and the inability to express a black color due to the characteristics of the optical system that is projected using light.

That is, in the present embodiment, as shown in FIG. 5, the mixed reality physical space 100b may be configured to improve the color gamut of the image by installing a surrounding environment configuration such as curtains 120 for minimizing visibility deterioration due to ambient light, and a black blind 110 for expressing a black color in the front surface.

As an example, it is possible to install low-reflection materials 110, 120 of a dark achromatic color that can convert the environment on the ceiling or inner wall of a physical space, and configure the surface of furniture 130 in the physical space with the low-reflection material. The low-reflection materials 110, 120 may include a curtain or blind that suppresses light reflection. The unfolding or folding operation of such curtain or blind can be controlled by an actuator. The actuator may include motors in a broad sense.

In such a mixed reality combined physical space environment, the illuminance of the lighting in the physical space can be set higher than a conventional traditional illuminance. In addition, the traditional physical space 100a may be converted into the mixed reality physical space 100b for a mixed reality lecture or conference by a switch operation or the like. In this case, the curtains 120 and the front blind 110 having a high extinction coefficient of the physical space are unfolded, so that the light generated by a lighting 150 is absorbed, and the black blind 110 at the front surface simultaneously performs the role of a display that expresses a black color and a role of a visor that blocks light, thereby effectively providing an immersive augmented reality environment or an immersive mixed reality environment in a physical space.

Figure 6:
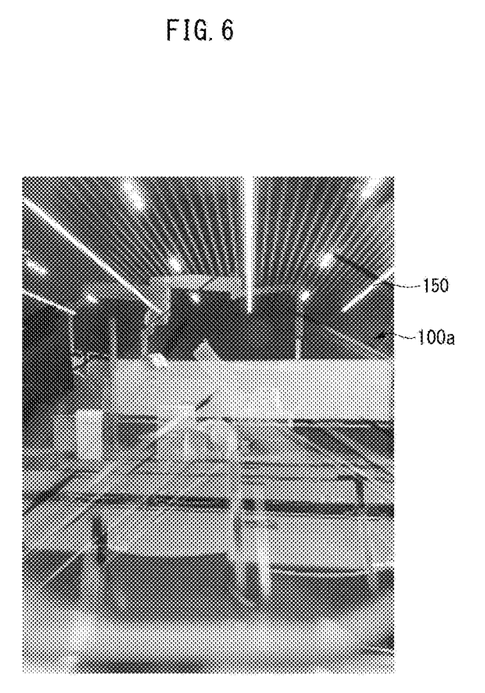
FIGS. 6 and 7 are another exemplary diagrams for describing a traditional environment of a mixed reality combined physical space and an immersive mixed reality environment.
Figure 7:
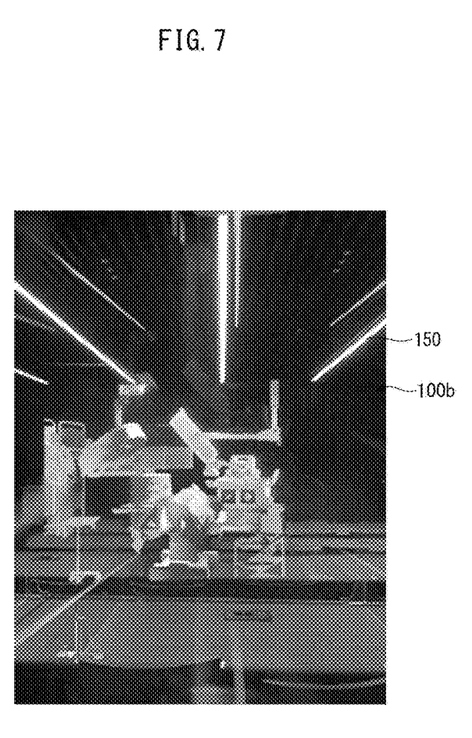

FIGS. 6 and 7 are another exemplary diagrams for describing a traditional environment of a mixed reality combined physical space and an immersive mixed reality environment.

As shown in FIG. 6, in the traditional physical space 100a, bright illuminance is provided to provide a traditional environment such as a lecture room, and the color gamut and color contrast of the headset for mixed reality are rapidly reduced due to the bright illuminance, and the generation of the background luminance $L_B$ is low by configuring the surface of the ceiling, inner wall and furniture with reflective materials, but the light of the lighting may deteriorate the visibility of the virtual image by the reflection and glare luminance $L_R$ generated by the optical element of the headset for the mixed reality and the light visor on the bottom.

Meanwhile, as shown in FIG. 7, in the mixed reality physical space 100b, the illuminance of the lighting 150 in the physical space 100b may be adjusted to 45 lux in order to implement an immersive environment. In addition, in the mixed reality physical space 100b, the black curtains 120 and the front blind 110 are unfolded to further lower the background luminance $L_B$, and the reflection and glare luminance $L_R$ is also generated less due to the sharply dropped illuminance. Accordingly, it is possible to provide an environment in which the optical sensor of the headset for mixed reality is normally operated, and it is also possible to improve the visibility of the virtual image.

Figure 8:
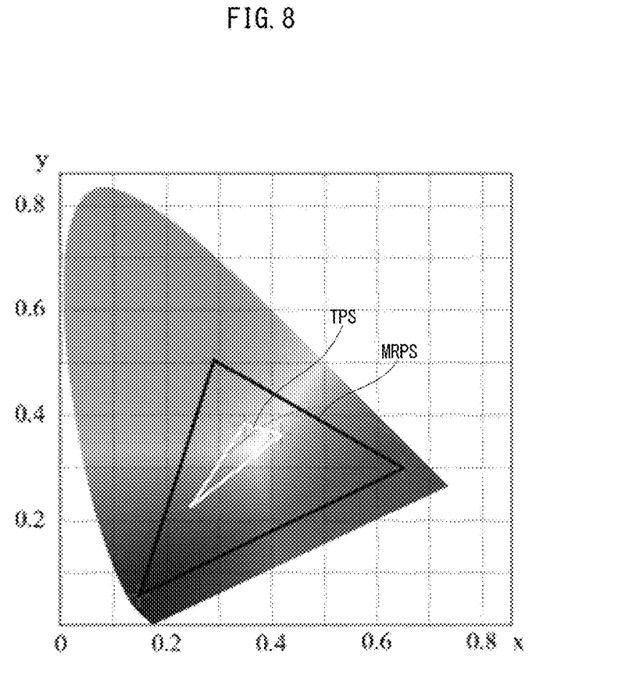
FIG. 8 is an exemplary diagram illustrating measurement results of a spectrometer and an optical probe for analyzing display optical characteristics of a traditional physical space and a mixed reality (MR) physical space that transforms the use of the traditional physical space.

FIG. 8 is an exemplary diagram illustrating measurement results of a spectrometer and an optical probe for analyzing display optical characteristics of a traditional physical space and a mixed reality (MR) physical space that transforms the use of the traditional physical space.

For this experiment, a GL Optics' spectrometer (Spectis 1.0), an optical probe (Optical Probe 5.0 luminance), and analysis software (GL Spectrosoft) for analyzing optical properties can be used.

As shown in FIG. 8, as an analysis result of the optical characteristics of the display device of the headset for mixed reality for each physical space environment, the color gamut compared to 72% of the national television system committee (NTSC) was 4.02% in the traditional physical space (TRS) environment and 60.38% in the mixed reality physical space (MRPS) environment, which was about 15.02 times improvement. The experimental results are summarized in Table 1.

TABLE 1

| Ambient light condition | | Traditional physical space | MR physical space |
|---|---|---|---|
| Luminance [lux] | | 796.48 | 45.59 |
| Color | Red | (0.4161, 03631) | (0.6498, 0.3007) |
| Coordinate | Green | (0.3472, 03825) | (0.2902, 0.5067) |
| (x, y) | Blue | (0.2455, 0.2266) | (0.1466, 0.0577) |
| Color gamut [%] | | 4.02 | 60.38 |

According to the results of this experiment, it can be seen that the color gamut of the headset for mixed reality with a projection display can be significantly and effectively improved in a wide physical space targeting multiple users.

Figure 9:
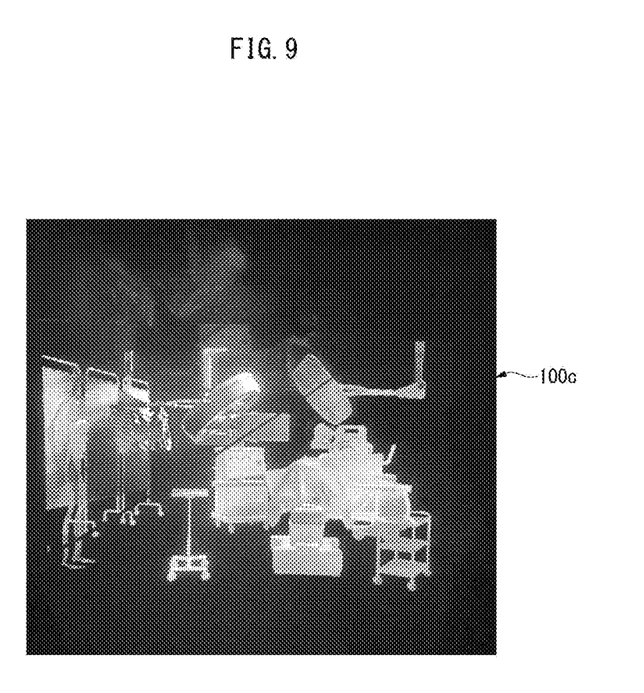
FIG. 9 is an exemplary diagram for describing a darkroom environment in a traditional physical space as a comparative example.

FIG. 9 is an exemplary diagram for describing a darkroom environment in a traditional physical space as a comparative example.

Referring to FIG. 9, in the darkroom environment 100c, since all ambient lights are turned off, the reflection and glare luminance $L_R$ and background luminance $L_B$ of the projection display are close to 0, so the color gamut close to the original image and high color contrast are obtained. However, if the minimum illuminance for recognizing the surrounding environment and motion is not secured, there may be a problem that the device for mixed reality does not operate.

Accordingly, while implementing an environment similar to the darkroom environment 100c, this embodiment is configured to provide the same illuminance environment as in the traditional physical space or an illuminance environment lower than the illuminance environment of the traditional physical space, and this embodiment may provide a mixed reality physical space environment having a high immersion under these conditions.

Figure 10:
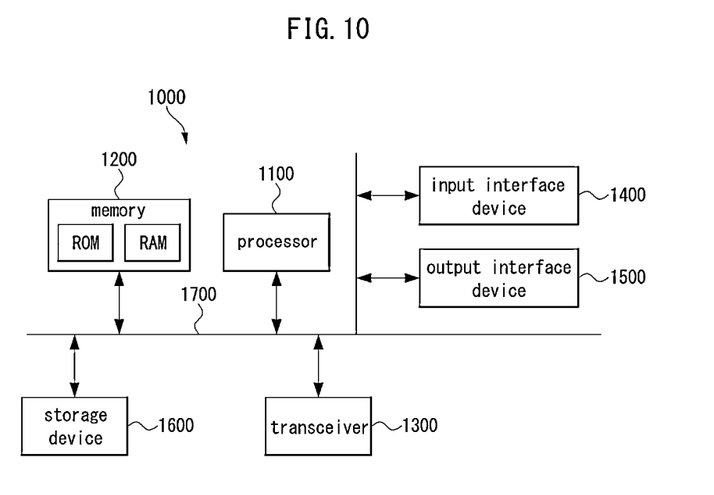
FIG. 10 is a schematic block diagram of a configuration of an apparatus for providing a mixed reality combined physical space according to another embodiment of the present disclosure.
Figure 11:
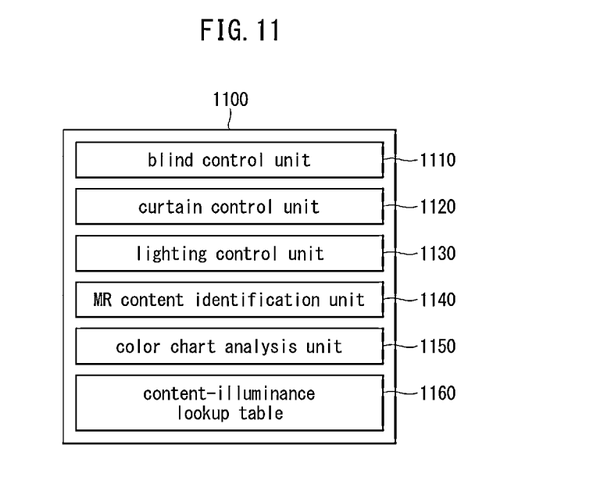
FIG. 11 is a block diagram of a software configuration that may be mounted on a processor of the apparatus for providing a physical space combined with mixed reality of FIG. 10.

FIG. 10 is a schematic block diagram of a configuration of an apparatus for providing a mixed reality combined physical space according to another embodiment of the present disclosure. FIG. 11 is a block diagram of a software configuration that may be mounted on a processor of the apparatus for providing a physical space combined with mixed reality of FIG. 10.

Referring to FIG. 10, an apparatus for providing a mixed reality combined physical space 1000 may include at least one processor 1100 and a memory 1200 that are mounted on a display headset or an electronic controller of a physical space. The electronic controller of a physical space may include a remote server connected to the headsets for mixed reality of multiple users in the physical space via a wireless network.

In addition, the apparatus for providing mixed reality combined physical space 1000 may further include a transceiver 1300 connected to a network to perform communication. In addition, the apparatus for providing mixed reality combined physical space 1000 may further include an input interface device 1400, an output interface device 1500, a storage device 1600, or the like. Each of the components included in the apparatus for providing mixed reality combined physical space 1000 may be connected by a bus 1700 to communicate with each other.

The processor 1100 may execute a program command stored in at least one of the memory 1200 and the storage device 1600. The processor 1100 may refer to a central processing unit (CPU), a graphics processing unit (GPU), or a dedicated processor on which methods according to embodiments of the present disclosure are performed.

A program command may include a command for configuring at least one component of the apparatus for providing a mixed reality combined physical space for providing a high immersion feeling of the present embodiment in software, a command for driving the at least some components, a command for executing the functions of the at least some components, or the like.

As an example, the program command may include a command for controlling the black blind in the front surface of the physical space (blind control command), a command for controlling the curtains on the inner wall of the physical space (curtain control command), a command for controlling the operation of a lighting in the physical space (light control command), a command for acquiring content data for mixed reality (MR) (data acquisition command), a command for MR content identification (MR content identification command), a color chart analysis command for analyzing a color chart of MR content, and a command for extracting a corresponding illuminance value from a content-illuminance lookup table according to the type of content or a preset classification (illuminance value extraction command).

As shown in FIG. 11, the above-described program command may be implemented with a blind control unit 1110, a curtain control unit 1110, a lighting control unit 1120, a MR content identification unit 1140 for acquiring and identifying MR data, and a color chart analysis unit 1150, which are mounted on the processor 1100. Although these units are described as individual units, it is apparent that two or more units may be integrated into one unit. In addition, the content-illuminance lookup table may be stored in the memory 1200 or storage device 1600 connected to the processor 1100, and the processor 1100 reads the content-illuminance lookup table 1160 to control the illuminance of the lighting device in the physical space with an optimal illuminance preset for all or at least a portion of the pre-identified MR content.

The lighting control unit 1120 may include an exposure control unit. In this case, the processor may be configured to analyze the color chart of the physical space while gradually increasing the minimum illuminance of the lighting in the physical space at a preset interval or gradually lowering the illuminance from the maximum illuminance at a preset interval to obtain an optimal value of a three-dimensional illuminance in the physical space.

Referring back to FIG. 10, each of the memory 1200 and the storage device 1600 may be configured as at least one of a volatile storage medium and a non-volatile storage medium. For example, the memory 1200 may be configured as at least one of a read only memory (ROM) and a random access memory (RAM). The memory 1200 and/or the storage device 1600 may be configured to store the content-illuminance lookup table for each MR content type or the analysis result of the color chart for each illuminance of lighting, and may be collectively referred to as a storage unit.

The transceiver 1300 may include a communication interface or a sub-communication system for a short-range wireless network or cable connection, communication with a satellite, wired or wireless communication with a general-purpose base station, or an ideal backhaul link or non-ideal backhaul link connection with a mobile edge core network or core network, or the like.

The input interface device 1400 may include at least one selected from input means such as a keyboard, a microphone, a touch pad, and a touch screen, and an input signal processor that maps or processes a signal input through at least one input means with a pre-stored command.

The above-described transceiver 1300 and/or the input interface device 1400 may be included in a signal reception unit that receives a signal for converting a traditional physical space into a mixed reality physical space in a mixed reality combined physical space. In this case, it is apparent that the signal reception unit may receive a signal for converting the mixed reality physical space into the traditional physical space.

The output interface device 1500 may include an output signal processor that maps or processes a signal outputted under the control of the processor 1100 to a pre-stored signal form or level, and an output means for outputting a signal or information in the form of vibration, light, etc. according to the signal of the output signal processor. At least one output means may include at least one selected from the output means such as a speaker, a display device, a printer, an optical output device, and a vibration output device.

As described above, in the present embodiment, the user's mixed reality immersion can be increased by improving the color gamut from the user's visual point of view viewing the mixed reality combined physical space through the projection display of the headset for mixed reality.

Figure 12:
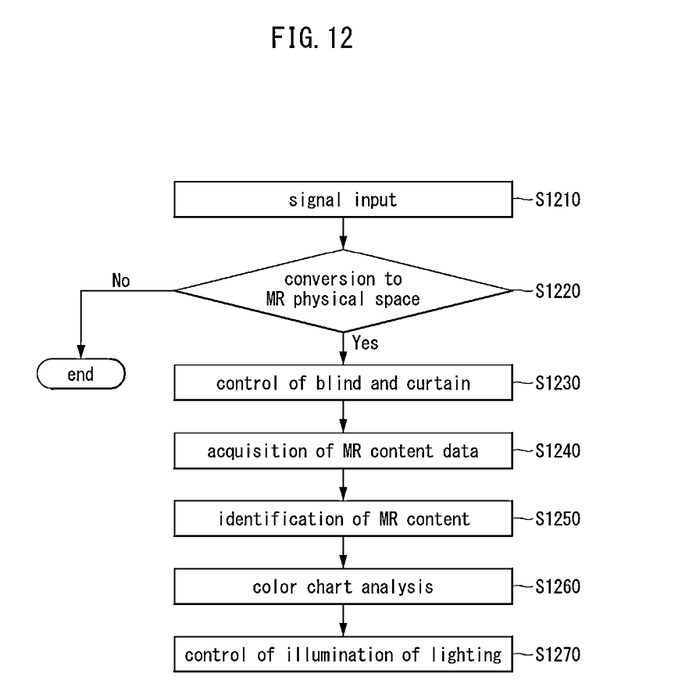
FIG. 12 is a flowchart illustrating a method for providing a mixed reality combined physical space according to another embodiment of the present disclosure.

FIG. 12 is a flowchart illustrating a method for providing a mixed reality combined physical space according to another embodiment of the present disclosure.

Referring to FIG. 12, when a preset level or type of signal is input to an apparatus for providing mixed reality combined physical space (S1210), the processor of the apparatus for providing mixed reality combined physical space determines whether to convert a traditional physical space into a mixed reality physical space according to the input of a predetermined signal (S1220). The processor may terminate a current process when a predetermined signal is not input. Also, in order to convert to the mixed reality physical space environment, the processor may perform controlling of blind and curtain (S1230).

Here, the traditional physical space may refer to a physical space in which the illuminance of a lighting is set to 700 lux or more in a state in which a black blind installed on a front surface is not unfolded and a black curtain on a wall surface are not unfolded in the mixed reality combined physical.

In addition, the mixed reality physical space may refer to a physical space in which the front black blind is unfolded to cover the front surface of the physical space in black and the black curtain on the wall surface is unfolded to cover the wall surface in black. In addition, the illuminance of the mixed reality physical space may be set to a specific illuminance that is substantially the same as or lower than the illuminance of a traditional physical space, for example, 45 lux.

Next, the processor may acquire content data for mixed reality (MR) (S1240).

The processor may be mounted on the headset for mixed reality and may be configured to acquire MR content data stored in a memory or storage device of the headset for mixed reality. In addition, the processor may be mounted on the electronic controller of a physical space and may be configured to receive the MR content data from the headset for mixed reality through a wired network or a wireless network.

That is, the acquisition of the MR content data may include acquiring the content itself, acquiring a content type identifier preset for the content, or acquiring some content for a predetermined time preset for the content. In addition, the acquisition of MR content data is processed by accessing the memory or storage device in which corresponding content is stored and extracting the necessary content or information. Alternatively, the acquisition of MR content data may be processed by receiving MR content data from a separate device storing the MR content data.

Next, the processor may selectively identify the MR content (S1250). The identification of the MR content may be configured to identify the type of the MR content, an average illuminance, and the like. Also, the processor may identify the MR content based on all or part of the MR content data. When a part of the MR content data is used as a reference, the processor may be configured to generate or output a plurality of identification values or a plurality of identification information according to the type or content of the MR content or the passage of time as a result of the identification of the MR content. This MR content identification information may be used to determine the illuminance in the physical space based on the content-illuminance lookup table.

Next, the processor may selectively analyze the color chart of the MR content (S1260). The analysis of the color chart may be used to obtain an average illuminance of MR content or to calculate an optimal illuminance. Such color chart analysis may be performed for a predetermined time or a plurality of times while gradually increasing or decreasing the illuminance of the lighting in the physical space with respect to all or part of the MR content data displayed on the projection display.

Next, the processor may control the illuminance of the lighting according to the identified MR content and/or the analysis result of the color chart (S1270). The processor may set a preset optimal illuminance according to the MR content or may control the illuminance of the lighting in the physical space with an optimal illuminance obtained according to the color chart analysis result according to a preset routine according to the type of MR content. The control of lighting illuminance may be configured to control the operation of lighting with preset multiple optimal illuminances according to the progress of an activity such as a mixed reality lecture based on the MR content.

As such, according to the configuration of this embodiment, it is possible to provide a mixed reality combined physical space that can perform conversion between a traditional physical space and a mixed reality physical space, and an environment for a perfect mixed reality immersion in this physical space.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for providing a mixed reality combined physical space performed by an electronic controller of a physical space, the method comprising the steps of:
   receiving a signal for conversion from a traditional physical space to a mixed reality physical space;
   controlling an operation of an actuator coupled to a curtain or blind that suppresses reflection of light on front and wall surfaces of the physical space according to an input of the signal such that the curtain or blind is unfolded;

controlling an illumination of a lighting of the mixed reality physical space to lower or increase the illumination at a specific level interval or continuously; and maintaining an illuminance of surrounding environment of an augmented reality display at a predetermined color temperature based on mixed reality content data by the controlling of the illumination of the lighting, the augmented reality display using an optical see-through system and being in the mixed reality physical space, wherein a quality of mixed reality content provided to the mixed reality physical space through the augmented reality display is improved.

2. The method according to claim 1, further comprising the step of analyzing a color chart of the illuminance of each stage of the lighting.

3. The method according to claim 2, further comprising the step of determining a first illuminance based on a color gamut of the mixed reality content according to an analysis result of the color chart.

4. The method according to claim 1, further comprising the step of storing in advance a plurality of illuminance values according to a type and content of the mixed reality content based on the mixed reality content used in the mixed reality physical space.

5. The method according to claim 4, further comprising the step of controlling the illuminance of the lighting over time based on the plurality of illuminance values.

6. A method for providing a mixed reality combined physical space performed by any one headset among headsets for mixed reality of multiple users, the method comprising the steps of:

receiving a signal for conversion from a traditional physical space to a mixed reality physical space;

controlling an operation of an actuator coupled to a curtain or blind that suppresses reflection of light on front and wall surfaces of the traditional physical space according to an input of the signal such that the curtain or blind is unfolded;

controlling an illumination of a lighting of the mixed reality physical space to lower or increase the illumination at a specific level interval or continuously; and maintaining an illuminance of surrounding environment of an augmented reality display at a color temperature based on mixed reality content data by the controlling of the illumination of the lighting, the augmented reality display using an optical see-through system and being in the mixed reality physical space, wherein a quality of mixed reality content provided to the mixed reality physical space through the augmented reality display is improved.

7. The method according to claim 6, further comprising the steps of:

analyzing a color chart of the illuminance of each stage of the lighting; and determining a first illuminance to be used in the mixed reality physical space based on a color gamut of the mixed reality content used in the mixed reality physical space according to an analysis result of the color chart.

8. The method according to claim 6, further comprising the step of storing in advance a plurality of illuminance values according to a type and content of the mixed reality content based on the mixed reality content used in the mixed reality physical space.

9. The method according to claim 8, further comprising the step of variably controlling the illuminance of the lighting over time based on the plurality of illuminance values.

10. The method according to claim 6, further comprising the steps of:

obtaining the mixed reality content data from a memory or storage device in which the mixed reality content used in the mixed reality physical space is stored;

identifying the mixed reality content based on the mixed reality content data;

determining a first illuminance based on a color gamut of the mixed reality content used in the mixed reality physical space according to an identification result of the mixed reality content; and controlling the lighting of the mixed reality physical space to the first illuminance.

11. The method according to claim 10, wherein the step of determining is performed based on a content-illuminance lookup table in which a relationship between the mixed reality content and the illuminance is set in advance.

12. An apparatus for providing a mixed reality combined physical space which is connected to headsets for mixed reality of multiple users, the apparatus comprising:

a signal reception unit that receives a signal for conversion from a traditional physical space to a mixed reality physical space, wherein an augmented reality display uses an optical see-through system and is in the mixed reality physical space;

a first control unit that controls an operation of an actuator coupled to a curtain or blind that is installed on a front surface of the traditional physical space and suppresses reflection of light according to an input of the signal such that the curtain or blind is unfolded;

a second control unit that controls an operation of at least one second actuator coupled to the curtain or blind that is installed on a wall surface of the traditional physical space and suppresses the reflection of light according to the input of the signal such that the curtain or blind is unfolded;

a lighting control unit that controls an illuminance of a lighting of the mixed reality physical space to a preset illuminance according to an identification result of mixed reality content used in the mixed reality physical space or to a predetermined illuminance by color chart analysis in advance, and maintains an illuminance of surrounding environment of the augmented reality display at a color temperature by controlling the illumination of the lighting;

an identification unit that acquires mixed reality content data used in the mixed reality combined physical space and identifies the mixed reality content based on the mixed reality content data; and a color chart analysis unit that analyzes a color chart of a corresponding illumination at a specific point in time according to a change in the lighting when the illuminance of the lighting is controlled by the lighting control unit to lower or increase the illuminance at a specific level interval or continuously.

13. The apparatus according to claim 12, further comprising a storage unit that stores the mixed reality content data used in the mixed reality physical space, or stores information on a preset illuminance according to an identification result of the mixed reality content, or an illumination predetermined in advance by a color chart analysis, wherein the storage unit stores a plurality of illuminance values predetermined through the color chart analysis according to a type and content of the mixed reality content based on the mixed reality content used in the mixed reality physical space.

14. The apparatus according to claim 13, wherein the lighting control unit controls the illuminance of the lighting over time based on the plurality of illuminance values.

15. The apparatus according to claim 12, wherein the apparatus for providing a mixed reality combined physical space is a computing device mounted on any one headset of the headsets for mixed reality of the multiple users or connected to the specific headset through a wireless network, and the computing device is an electronic device of a physical space and is provided with a processor.

16. The apparatus according to claim 15, wherein the processor connected to the signal reception unit determines a first illuminance based on a color gamut of the mixed reality content used in the mixed reality physical space according to an identification result of the mixed reality content, and controls an operation of the lighting to the first illuminance through the lighting control unit.

17. The apparatus according to claim 15, wherein the processor connected to the signal reception unit determines a first illuminance based on a color gamut of the mixed reality content used in the mixed reality physical space according to an analysis result of the color chart, and controls an operation of the lighting to the first illumination through the lighting control unit.

18. The apparatus according to claim 17, wherein the color chart analysis unit determines a plurality of illuminance values according to a type or content of the mixed reality content based on the mixed reality content used in the mixed reality physical space.

19. The apparatus according to claim 18, wherein the lighting control unit controls the illuminance of the lighting over time based on the plurality of illuminance values.

20. The apparatus according to claim 18, wherein the plurality of illuminance values is determined in an illuminance range in which the headsets for mixed reality are operable.

* * * * *